(12) United States Patent
Kataoka et al.

(10) Patent No.: US 10,247,260 B2
(45) Date of Patent: Apr. 2, 2019

(54) POWER TRANSMITTING APPARATUS

(71) Applicant: Kabushiki Kaisha F.C.C., Hamamatsu-shi (JP)

(72) Inventors: Makoto Kataoka, Hamamatsu (JP); Han Hiong Chen, Hamamatsu (JP); Kaoru Aono, Hamamatsu (JP)

(73) Assignee: Kabushiki Kaisha F.C.C., Hamamatsu-shi (JP)

( * ) Notice: Subject to any disclaimer, the term of this patent is extended or adjusted under 35 U.S.C. 154(b) by 89 days.

(21) Appl. No.: 15/430,451

(22) Filed: Feb. 11, 2017

(65) Prior Publication Data

US 2017/0184156 A1 Jun. 29, 2017

Related U.S. Application Data

(63) Continuation of application No. PCT/JP2015/072581, filed on Aug. 7, 2015.

(30) Foreign Application Priority Data

Aug. 12, 2014 (JP) ................................. 2014-164085

(51) Int. Cl.
*F16D 23/12* (2006.01)
*F16D 13/02* (2006.01)
*F16D 7/02* (2006.01)
*F16D 13/52* (2006.01)
(Continued)

(52) U.S. Cl.
CPC ............. *F16D 23/12* (2013.01); *F16D 7/027* (2013.01); *F16D 13/02* (2013.01); *F16D 13/52* (2013.01); *F16D 43/21* (2013.01); *F16D 2013/565* (2013.01); *F16D 2023/123* (2013.01)

(58) Field of Classification Search
CPC .................................................. F16D 2013/565
See application file for complete search history.

(56) References Cited

U.S. PATENT DOCUMENTS

2009/0260942 A1* 10/2009 Matsuda ................. F16D 13/04
192/54.52
2014/0326570 A1* 11/2014 Isobe ...................... F16D 13/56
192/70.11

FOREIGN PATENT DOCUMENTS

| EP | 1972819 A1 | 9/2008 |
| EP | 2565483 A2 | 3/2013 |
| EP | 2799734 A1 | 11/2014 |

(Continued)

OTHER PUBLICATIONS

European Search Report from corresponding Application No. EP 15831300.7, dated Mar. 28, 2018.

*Primary Examiner* — Mark A Manley
(74) *Attorney, Agent, or Firm* — Harness, Dickey & Pierce, P.L.C.

(57) ABSTRACT

A power transmitting apparatus has a clutch member and a pressure member. The cam surfaces of the pressure-contact assist cam face each other. The cam surfaces of the back torque limiter cam face each other. A receiving portion for a clutch spring (10) on the pressure member (5) side has a receiving member (11) separate from the pressure member (5). A first cam surface (C1) and a second cam surface (C2), constituting the back torque limiter cam, are, respectively, formed on the receiving member (11) and the clutch member (4). A third cam surface (C3) and a fourth cam surface (C4), constituting the pressure-contact assist cam, are, respectively, formed on the pressure member (5) and the clutch member (4).

9 Claims, 12 Drawing Sheets

(51) Int. Cl.
*F16D 43/21* (2006.01)
*F16D 13/56* (2006.01)

(56) References Cited

FOREIGN PATENT DOCUMENTS

| | | | |
|---|---|---|---|
| JP | S60157515 A | | 8/1985 |
| JP | 5-71554 | | 3/1993 |
| JP | 2011-153655 | | 8/2011 |
| JP | 2013-137039 | | 7/2013 |
| JP | WO2013/100130 | * | 7/2013 |
| WO | WO-2007032283 A1 | | 3/2007 |
| WO | WO-2007088766 A1 | | 8/2007 |

* cited by examiner

POWER TRANSMITTING APPARATUS

CROSS-REFERENCE TO RELATED APPLICATIONS

This application is a continuation of International Application No. PCT/JP2015/072581, filed Aug. 7, 2015, which claims priority to Japanese Application No. 2014-164085, filed Aug. 12, 2014. The disclosures of the above applications are incorporating herein by reference.

FIELD

The present disclosure relates to a power transmitting apparatus that arbitrarily transmits or cuts off rotational force of an input member to an output member.

BACKGROUND

In general, power transmitting apparatuses for motorcycles are intended to arbitrarily transmit or cut off driving force of an engine to a transmission and a driving wheel. Such power transmitting apparatuses typically includes an input member, output member and clutch member. The input member is connected to the engine side. The output member is connected to the transmission and the driving wheel side. The clutch member is connected to the output member. The power is transmitted by bringing a plurality of driving clutch plates and driven clutch plates into pressure contact. The transmission of the power is cut off by releasing the pressure-contact force.

More specifically, a conventional power transmitting apparatus includes, as disclosed, for example in JP2013-137039, a clutch housing. The clutch housing rotates with the rotation of an input member. A plurality of driving clutch plates is formed on the clutch housing. A plurality of driven clutch plates are alternately formed with the driving clutch plates of the clutch housing. A clutch member is connected to an output member. A pressure member, attached to the clutch member, is movable in the axial direction of the clutch member. The pressure member brings the driving clutch plates and the driven clutch plates into pressure contact or release pressure-contact by its axial movement relative to the clutch member. The pressure member is configured to transmit or cut off rotational force input to the input member to the output member by bringing the driving clutch plates and the driven clutch plates into pressure contact or releasing pressure-contact force.

The above conventional power transmitting apparatus further has a pressure-contact assist cam and a back torque limitation cam. When the rotational force input to the input member is transmitted to the output member and the pressure member and the clutch member rotate relative to each other, the pressure assist cam can move the pressure member and the clutch member closer to each other. This increases the pressure-contact force between the driving clutch plates and the driven clutch plates. When the rotation of the output member exceeds the rotational speed of the input member and the pressure member and the clutch member rotate relative to each other, a back pressure limiter cam moves the pressure member and the clutch member away from each other. This releases the pressure-contact force between the driving clutch plates and the driven clutch plates. The pressure-contact assist cam and back torque limiter cam are each formed by opposing cam surfaces formed on the pressure member and the clutch member. When the pressure member and the clutch member rotate relative to each other to the normal rotation side, the pressure-contact assist cam operates. When the pressure member and the clutch member rotate relative to each other to the reverse rotation side, the back torque limiter cam operates. The torque, when the back torque limiter cam operates, and the torque, when the pressure-contact assisting cam operates, is preferably variously set according to needs, such as the form of a vehicle and driver's preferences.

SUMMARY

However, the above-described conventional power transmitting apparatus has the following problem.

For example, when torque is small and when the back torque limiter cam operates, the cam surfaces of the back torque limiter cam and the cam surfaces of the pressure-contact assist cam need to have different slope angles. In this case, a problem exists in that, in order to assemble the clutch member and the pressure member with the cam surfaces of the pressure-contact assist cam facing each other and the cam surfaces of the back torque limiter cam facing each other, the clearance between a pair of cam surfaces constituting the back torque limiter cam must be set relatively large. The clearance causes rattling, noise, and vibration. Therefore, the slope angles of the pressure-contact assist cam and the back torque limiter cam are preferably set within a certain range.

When the torque is small and when the back torque limiter cam operates, the pressure-contact assist cam is set so as not to rattle. When the torque is large and when the pressure-contact assist cam operates, the power is transmitted at an unintended timing for a driver and operability may be adversely affected. Therefore, it is not appropriate to needlessly adjust the slope angle of the back torque limiter cam.

The present disclosure overcomes these shortcomings. It is an object of the disclosure to provide a power transmitting apparatus where the torque, when a back torque limiter cam operates, and the torque, when a pressure-contact assist cam operates, can be made different from each other according to operating needs. A clutch member and a pressure member can be satisfactorily assembled with the cam surfaces of the pressure-contact assist cam facing each other and the cam surfaces of the back torque limiter cam facing each other. Thus, rattling can be reduced.

According to the disclosure, a power transmitting apparatus comprises a clutch housing that rotates with the rotation of an input member. A plurality of driving clutch plates is attached to the housing. A clutch member includes a plurality of driven clutch plates alternately positioned with the driving clutch plates of the clutch housing. The clutch is connected to an output member. A pressure member is attached to the clutch member. The pressure member brings the driving clutch plates and the driven clutch plates into pressure contact or releases the pressure-contact force with its axial movement relative to the clutch member. A biasing spring biases the pressure member in a direction so that the driving clutch plates and the driven clutch plates come into pressure contact. A pressure-contact assist cam increases the pressure-contact force between the driving clutch plates and the driven clutch plates when the rotational force input into the input member is transmitted to the output member and the pressure member and the clutch member rotate relative to each other. A back torque limiter cam releases the pressure-contact force between the driving clutch plates and driven clutch plates when the rotation of the output member exceeds the rotational speed of the input member and the pressure member and the clutch member rotate relative to each other. The power transmitting apparatus transmits or cuts off the rotational force input to the input member to the output member by bringing the driving clutch plates and the driven clutch plates into pressure contact or releasing the pressure-contact force. A receiving portion for the biasing spring on the pressure member side includes at least one receiving member separate from the pressure member. A first cam surface and a second cam surface, constituting one of the pressure-contact assist cam and the back torque limiter cam, are, respectively, formed on the at least one receiving member and the clutch member. A third cam surface and a fourth cam surface, constituting the other of the pressure-contact assist cam and the back torque limiter cam are, respectively, formed on the pressure member and the clutch member.

The first cam surface and the second cam surface constitute the back torque limiter cam. The third cam surface and the fourth cam surface constitute the pressure-contact assist cam.

The at least one receiving member has a fifth cam surface formed on the side opposite to the first cam surface. A sixth cam surface faces the fifth cam surface. The sixth cam surface is formed on the pressure member. The back torque limiter cam is formed by the first cam surface and the second cam surface and the fifth cam surface and the sixth cam surface.

The slope angle of the first cam surface and the second cam surface, constituting the back torque limiter cam, is substantially the same as that of the third cam surface and the fourth cam surface, constituting the pressure-contact assist cam.

The slope angle of the first cam surface and the second cam surface is substantially the same as that of the fifth cam surface and the sixth cam surface.

The at least one receiving member has a recessed portion that houses the biasing spring. A receiving portion is formed in the recessed portion. The receiving portion contacts one end of the biasing spring and receives its biasing force. A transmitting portion on the receiving member contacts the pressure member. The transmitting portion transmits the biasing force of the biasing spring to the pressure member.

At least cam surfaces formed on the at least one receiving member and cam surfaces facing those cam surfaces include flat surfaces. A plurality of the receiving members are concyclically attached to the pressure member. The plurality of receiving members are integrated with one another.

A receiving portion for the biasing spring on the pressure member side includes at least one receiving member separate from the pressure member. A first cam surface and a second cam surface, constituting one of the pressure-contact assist cam and the back torque limiter cam, are, respectively, formed on the at least one receiving member and the clutch member. A third cam surface and a fourth cam surface, constituting the other of the pressure-contact assist cam and the back torque limiter cam, are, respectively, formed on the pressure member and the clutch member. Thus, the torque, when the back torque limiter cam operates, and the torque, when the pressure-contact assist cam operates, can be made different from each other according to the power transmitting needs. The clutch member and the pressure member include the cam surfaces of the pressure-contact assist cam facing each other. Also, the cam surfaces of the back torque limiter cam face each other. Thus, rattling can be reduced.

The first cam surface and the second cam surface constitute the back torque limiter cam. The third cam surface and the fourth cam surface constitute the pressure-contact assist cam. Thus, the torque, when the back torque limiter cam operates, can be arbitrarily set by determining the slope angle of the first cam surface formed on the at least one receiving member.

The at least one receiving member has a fifth cam surface formed on the side opposite to the first cam surface. A sixth cam surface faces the fifth cam surface. The sixth cam surface is formed on the pressure member. The back torque limiter cam is formed by the first cam surface and the second cam surface and the fifth cam surface and the sixth cam surface. Therefore, the torque, when the back torque limiter cam operates, can be easily set at a large value.

The slope angle of the first cam surface and the second cam surface, constituting the back torque limiter cam, is substantially the same as that of the third cam surface and the fourth cam surface, constituting the pressure-contact assist cam. Thus, the torque, when the back torque limiter cam operates, via the cam action of the fifth cam surface and the sixth cam surface, can be set at a larger value compared to the torque when the pressure-contact assist cam operates.

The slope angle of the first cam surface and the second cam surface is substantially the same as that of the fifth cam surface and the sixth cam surface. Thus, the at least one receiving member can smoothly operate when the back torque limiter cam operates.

The at least one receiving member has a recessed portion that receives the biasing spring. A receiving portion is formed in the recessed portion. The receiving portion is in contact with one end of the biasing spring and receives its biasing force. A transmitting portion is in contact with the pressure member and transmits the biasing force of the biasing spring to the pressure member. Thus, when the back torque limiter cam operates, the pressure-contact force between the driving clutch plates and the driven clutch plates can be released more reliably and smoothly.

At least cam surfaces formed on the at least one receiving member and cam surfaces facing those cam surfaces include flat surfaces. Therefore, the at least one receiving member is independent of the size of the power transmitting apparatus (diameters of the clutch member and the pressure member). The versatility of the at least one receiving member can be improved and production cost can be reduced.

A plurality of the receiving members are concyclically attached to the pressure member. Therefore, the function as a pressure-contact assisting cam or a back torque limiter cam, when the receiving members operate, can be performed smoothly and reliably.

The plurality of receiving members are integrated with one another. Thus, the plurality of receiving members can be attached to the pressure member all at once. Assembly of the receiving members can be improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 8:
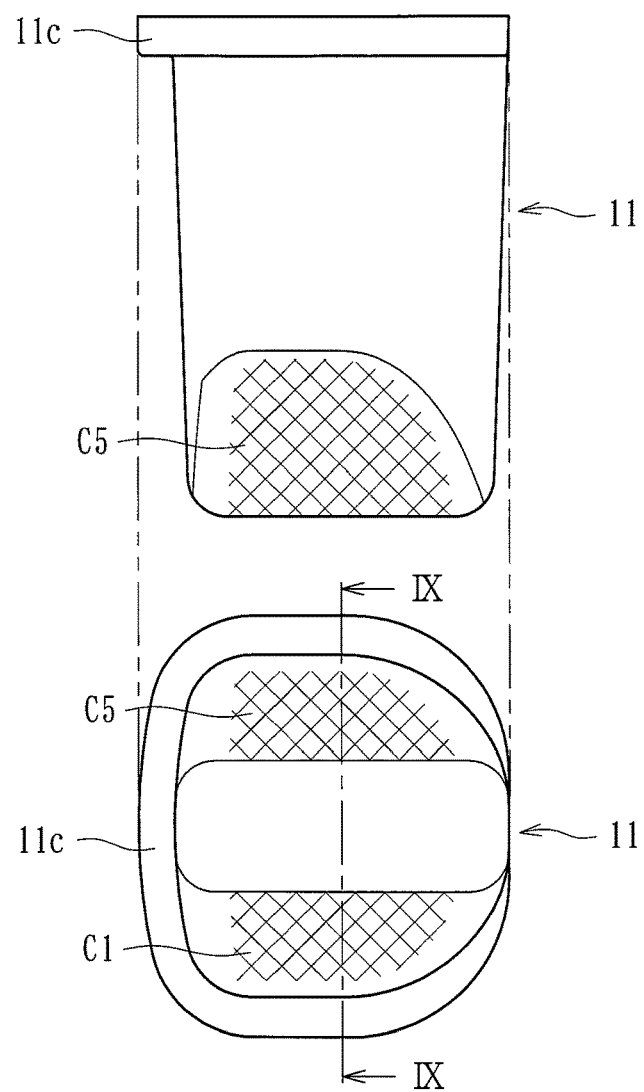

FIG. 8 includes a side view and a bottom view of a receiving member in the power transmitting apparatus.

Figure 9:
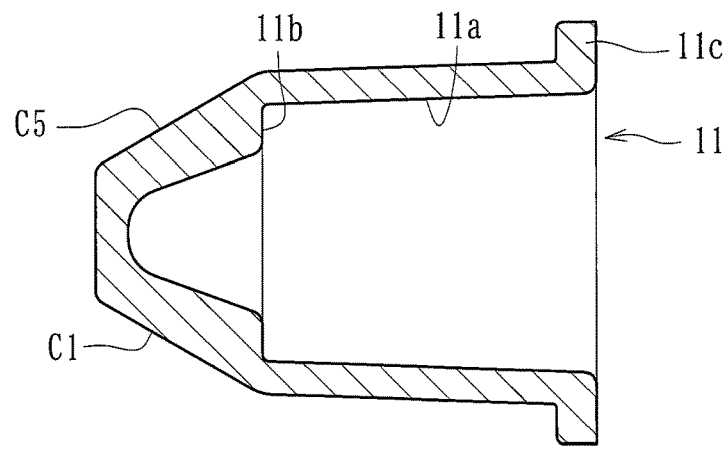

FIG. 9 is a sectional view taken along line IX-IX of FIG. 8.

Figure 10:
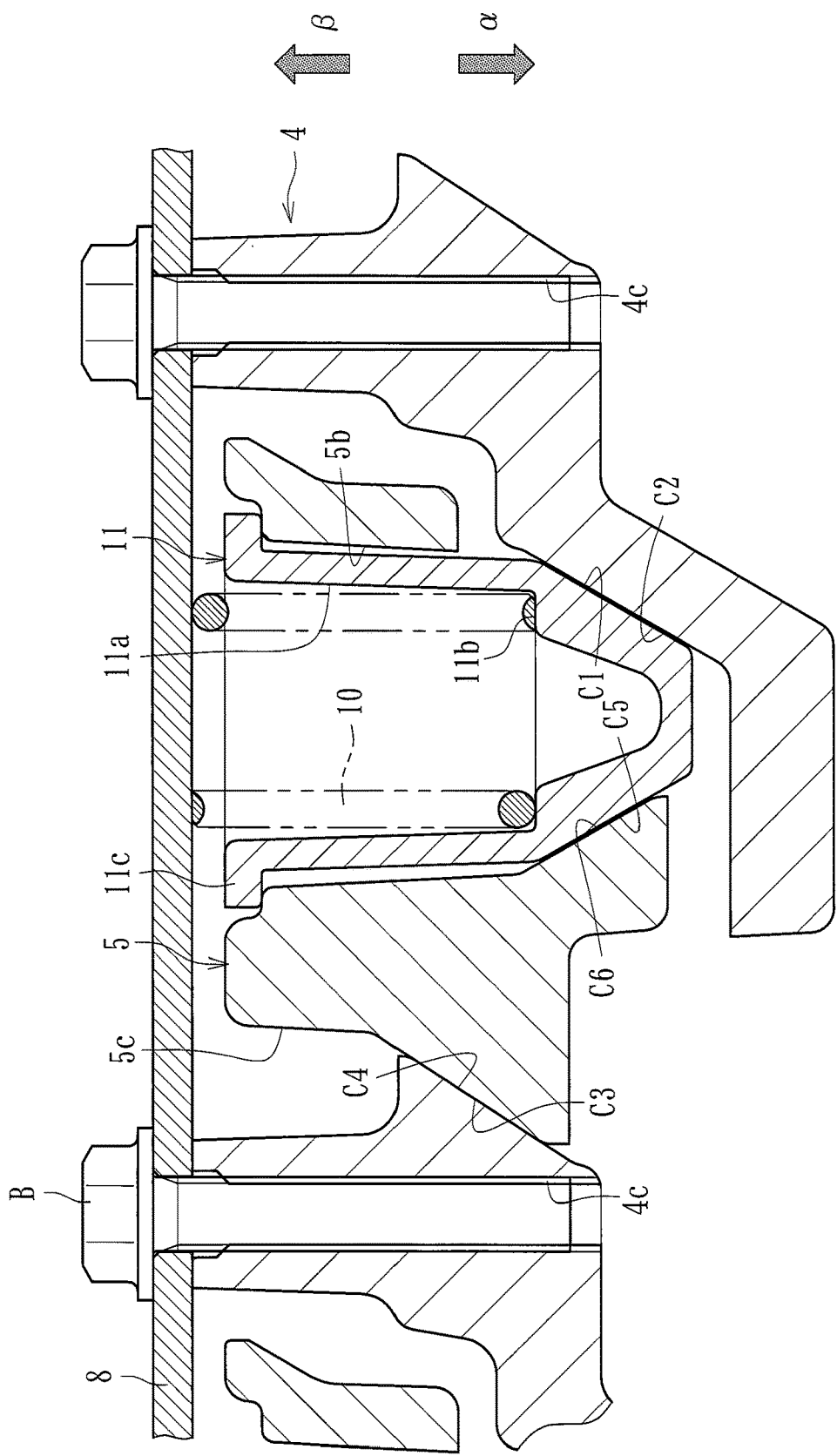

FIG. 10 is a developed sectional view of a third cam surface and a fourth cam surface constituting a pressure-contact assisting cam and a first cam surface and a second cam surface, and a fifth cam surface and a sixth cam surface constituting a back torque limiter cam in the power transmitting apparatus.

Figure 11A:
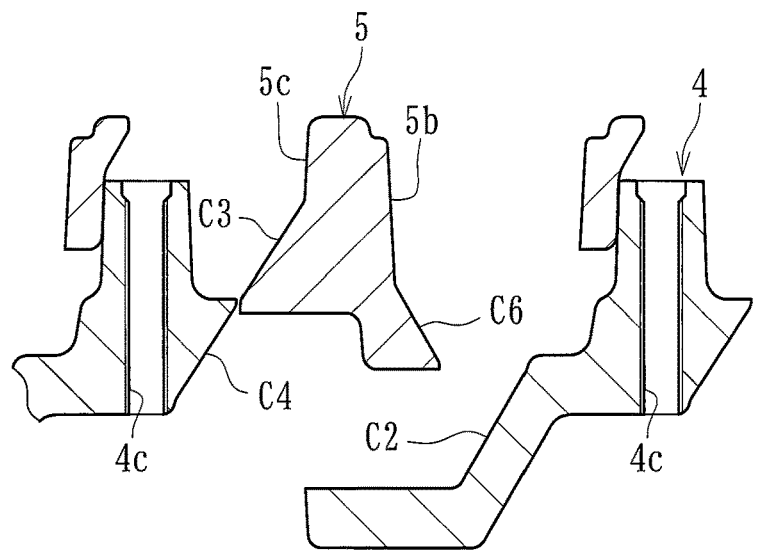
Figure 11B:
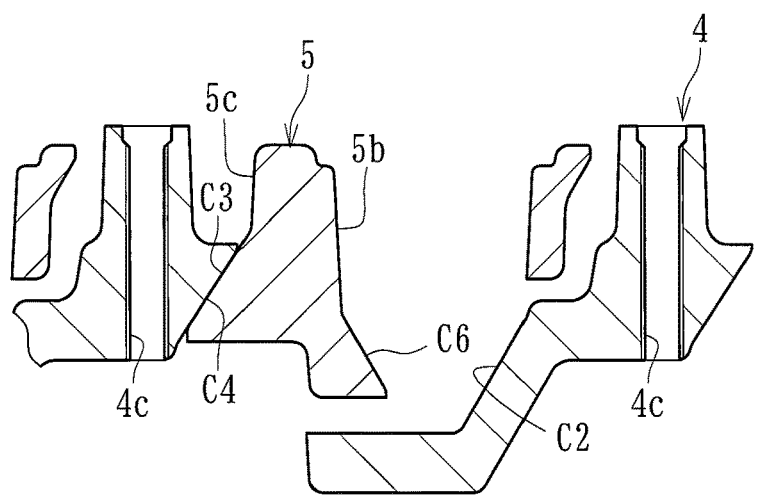
Figure 11C:
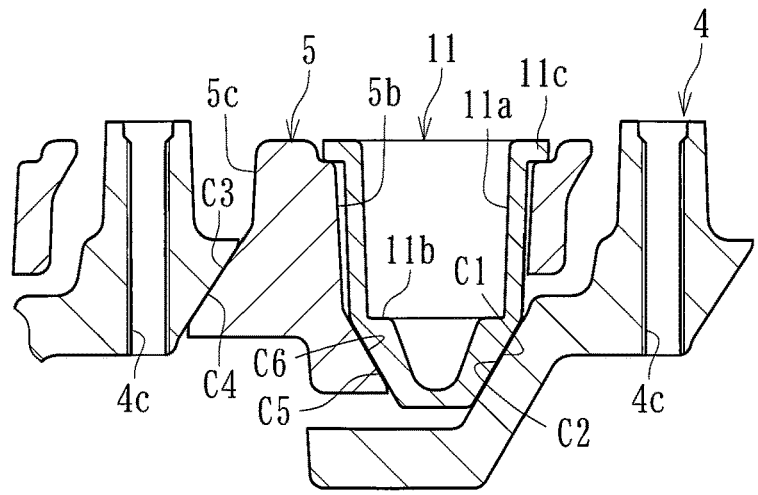

FIGS. 11 (a)-(c) include developed sectional views of the process of assembling the clutch member and the pressure member in the power transmitting apparatus.

Figure 12A:
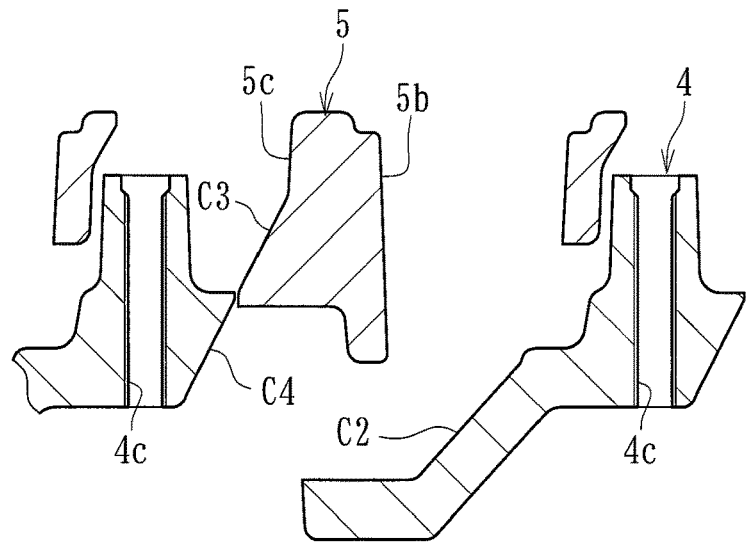
Figure 12B:
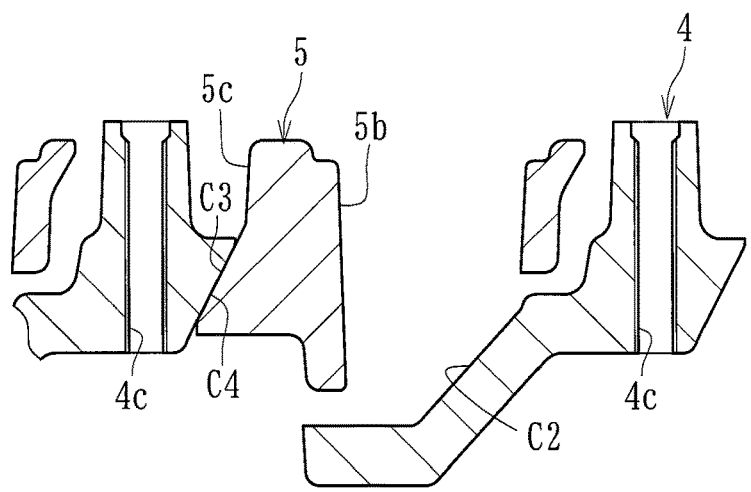
Figure 12C:
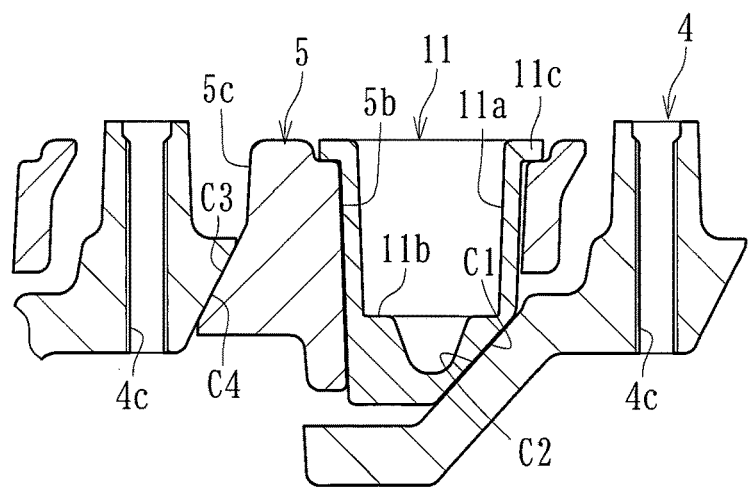

FIGS. 12 (a)-(c) include developed sectional views of the process of assembling the clutch member and the pressure member in a power transmitting apparatus according to another embodiment of the present disclosure.

Figure 13:
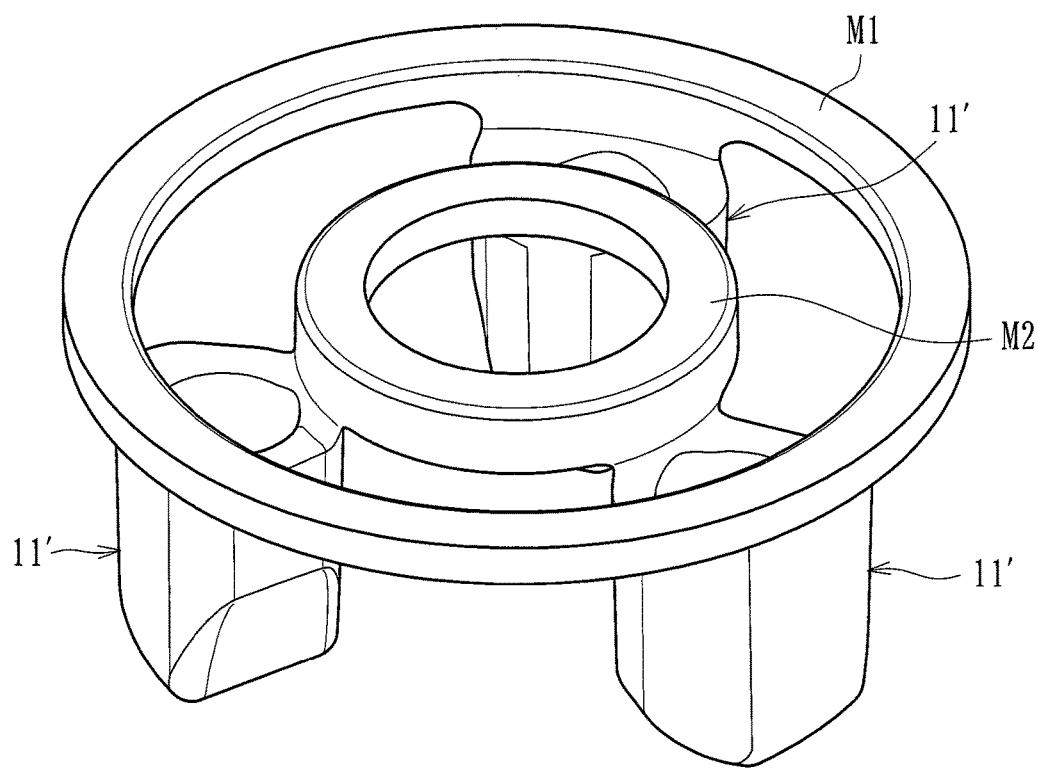

FIG. 13 is a perspective view of receiving members in a power transmitting apparatus according to another embodiment of the present disclosure.

DETAILED DESCRIPTION

Figure 1:
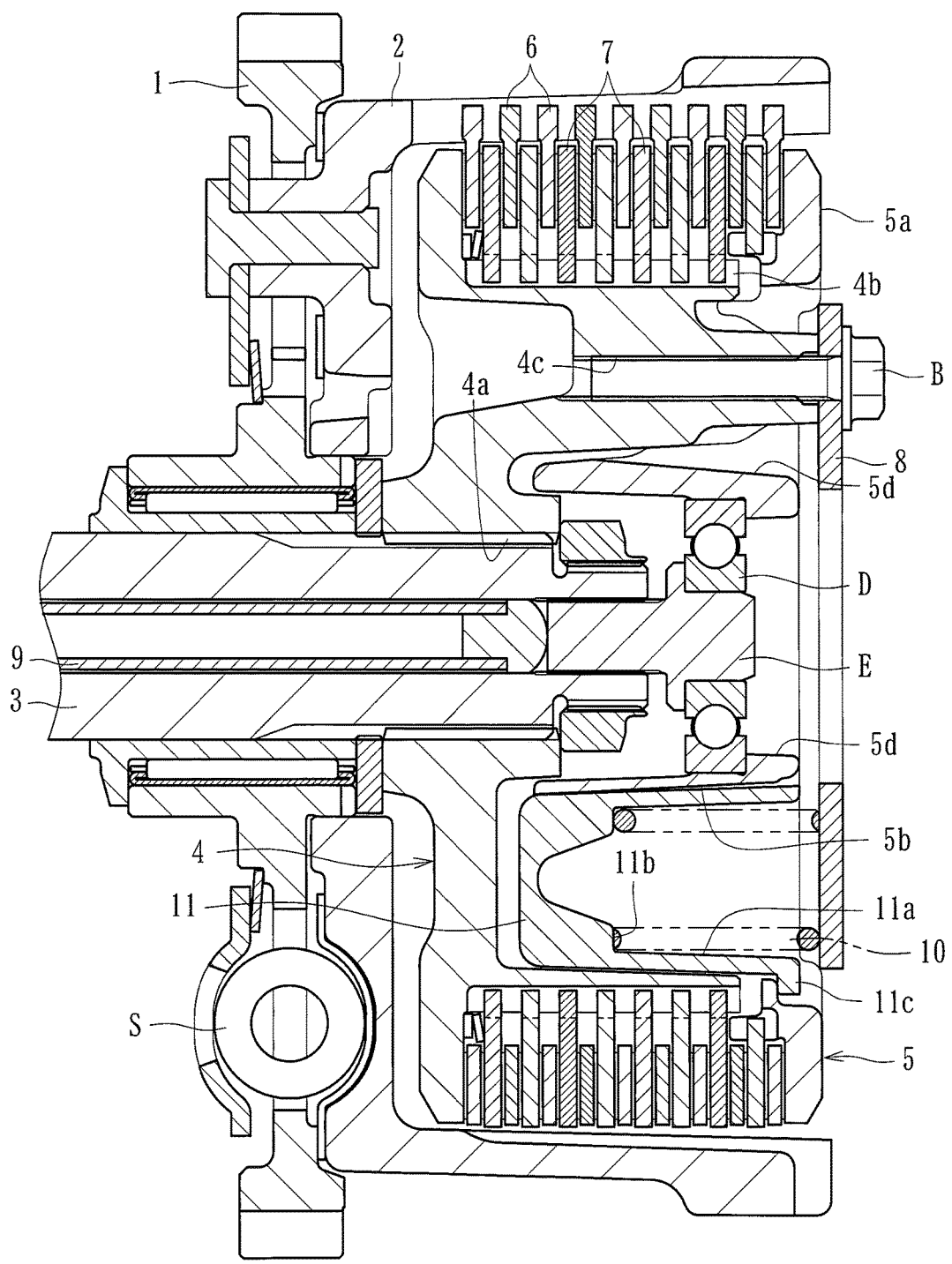
FIG. 1 is an overall longitudinal sectional view of a power transmitting apparatus according to an embodiment of the present disclosure.

Embodiments of the present disclosure will be specifically described below with reference to the drawings. A power transmitting apparatus according to this embodiment is mounted on a vehicle, such as a motorcycle, to arbitrarily transmit or cut-off the driving force of an engine to a transmission or driving wheel. As shown in FIG. 1, the power transmitting apparatus includes a clutch housing 2. A gear 1, as an input member, is mounted on the clutch housing 2. A clutch member 4 is connected to a shaft 3, as an output member. A pressure member 5 is formed at the right end of the figure of the clutch member 4. Driving clutch plates 6 are connected to the clutch housing 2. Driven clutch plates 7 are connected to the clutch member 4. A fixing member 8, a pushrod 9, clutch springs 10 as biasing means, and at least one receiving member 11 are in the housing 2. In the figure, the reference sign S denotes a damper and the reference sign D denotes a ball bearing.

The gear 1 rotates about the shaft 3 when driving force (rotational force) is transmitted from the engine. The gear 1 is connected to the clutch housing 2 with rivets or the like. The clutch housing 2 includes a cylindrical case member that is open at its right end in the figure. The plurality of driving clutch plates 6 are attached to the inner peripheral wall of the housing 2. The driving clutch plates 6 are each made from a plate material formed in a substantially annular shape. The clutch plates 6 are fit in a spline forming onto the inner peripheral surface of the clutch housing 2. Thus, the clutch plates 6 rotate with the rotation of the clutch housing 2. The clutch plates 6 can slide in the axial direction (horizontal direction in FIG. 1).

Figure 2:
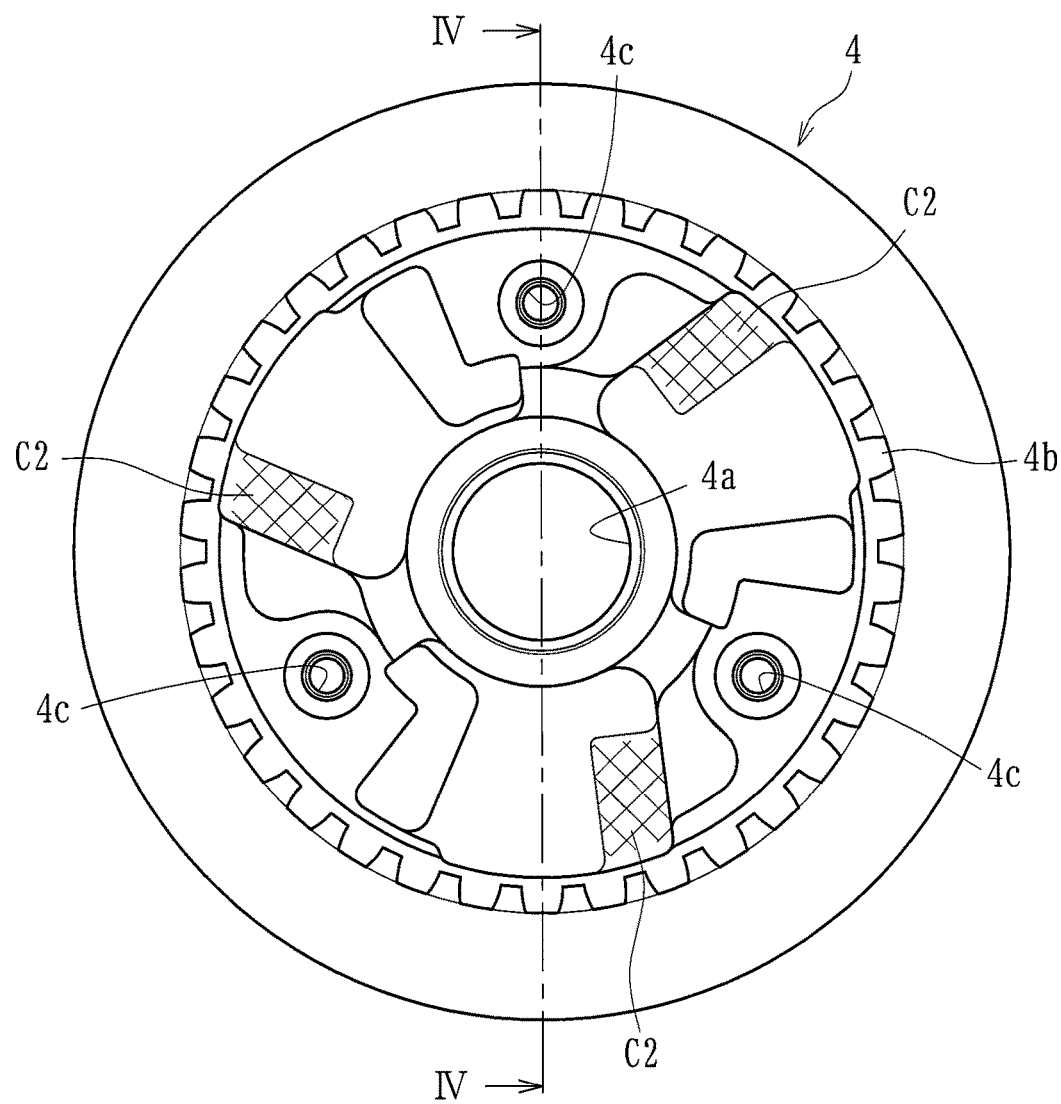
FIG. 2 is a front plan view of a clutch member in the power transmitting apparatus.
Figure 3:
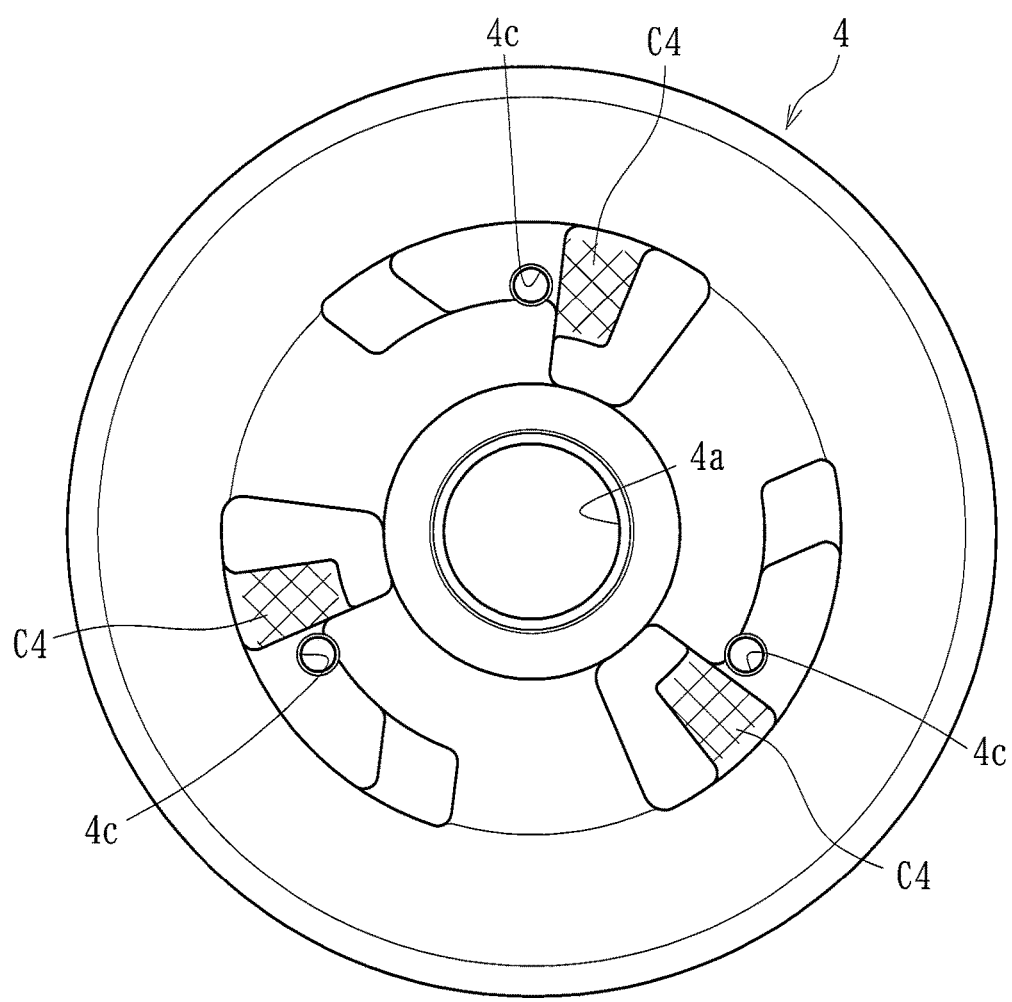
FIG. 3 is a rear plan view of the clutch member in the power transmitting apparatus.
Figure 4:
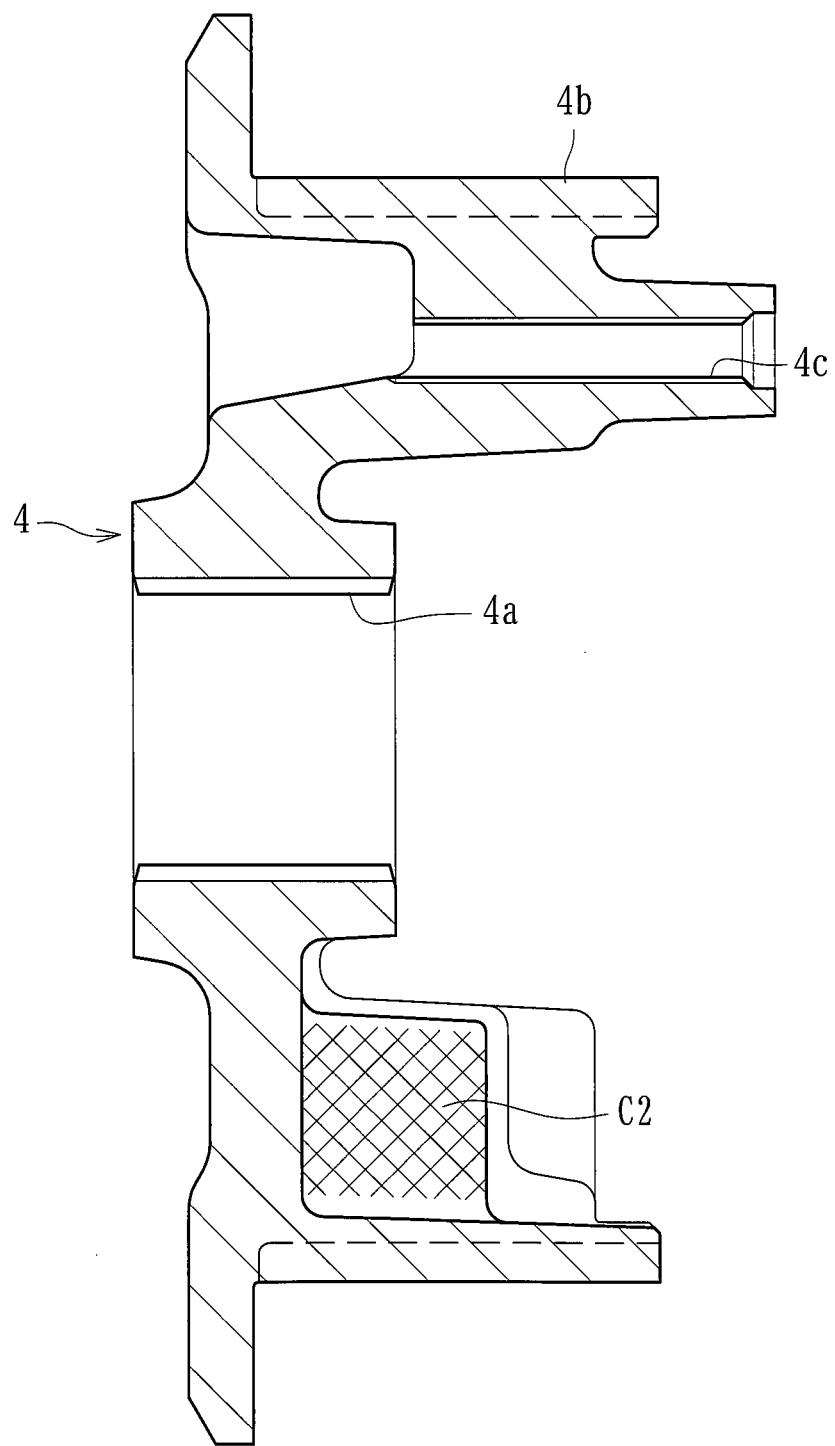
FIG. 4 is a sectional view taken along line IV-IV of FIG. 2.

The clutch member 4 includes a member disposed in the clutch housing 2. As shown in FIGS. 2 to 4, the clutch member has a central hole 4a that receives the shaft 3. An outer peripheral wall 4b includes a spline. Bolt holes 4c receives bolts B. A spline is formed on each of the inner peripheral surface of the central hole 4a and the outer peripheral surface of the shaft 3. The shaft 3 is connected to the central hole 4a by spline fitting. Thus, when the clutch member 4 rotates, the shaft 3 also rotates. The driven clutch plates 7 are fit into and attached to the splines formed on the outer peripheral wall 4b.

More specifically, the splines, formed on the outer peripheral wall 4b of the clutch member 4, includes a groove-ridge shape integrally formed substantially throughout the circumference of the outer peripheral wall 4b. The driven clutch plates 7 are fit into grooves constituting the spline. Thus, the movement of the driven clutch plates 7 relative to the clutch member 4 is allowed in the axial direction. Movement is restricted in the rotational direction. The driven clutch plates 7 can rotate together with the clutch member 4.

The driven clutch plates 7 are alternately stacked between the driving clutch plates 6. Thus, each adjacent pair of driving clutch plate 6 and driven clutch plate 7 are brought into pressure contact or released from the pressure-contact force. The driving clutch plates 6 and the driven clutch plates 7 are allowed to slide in the axial direction of the clutch member 4. When pressed by the pressure member 5 to the left in FIG. 1, the plates 6, 7 are brought into pressure contact. The rotational force of the clutch housing 2 is transmitted through the clutch member 4 to the shaft 3. When pressure from the pressure member 5 is released, the pressure-contact force is released. The clutch member 4 stops following the rotation of the clutch housing 2 and stops. Thus, the rotational force is not transmitted to the shaft 3.

The fixing member 8 is fixed by the bolts B passed through the bolt holes 4c. The clutch springs 10, serving as a biasing means, are attached to the fixing member 8. The clutch springs 10 are coil springs with one end in contact with the receiving members 11. The other end is in contact with and attached to the fixing member 8. The springs 10 always bias the pressure member 5 in a direction such that the driving clutch plates 6 and the driven clutch plates 7 are brought into pressure contact. Thus, the plates are in a direction so that the pressure member 5 is moved closer to the clutch member 4.

Figure 5:
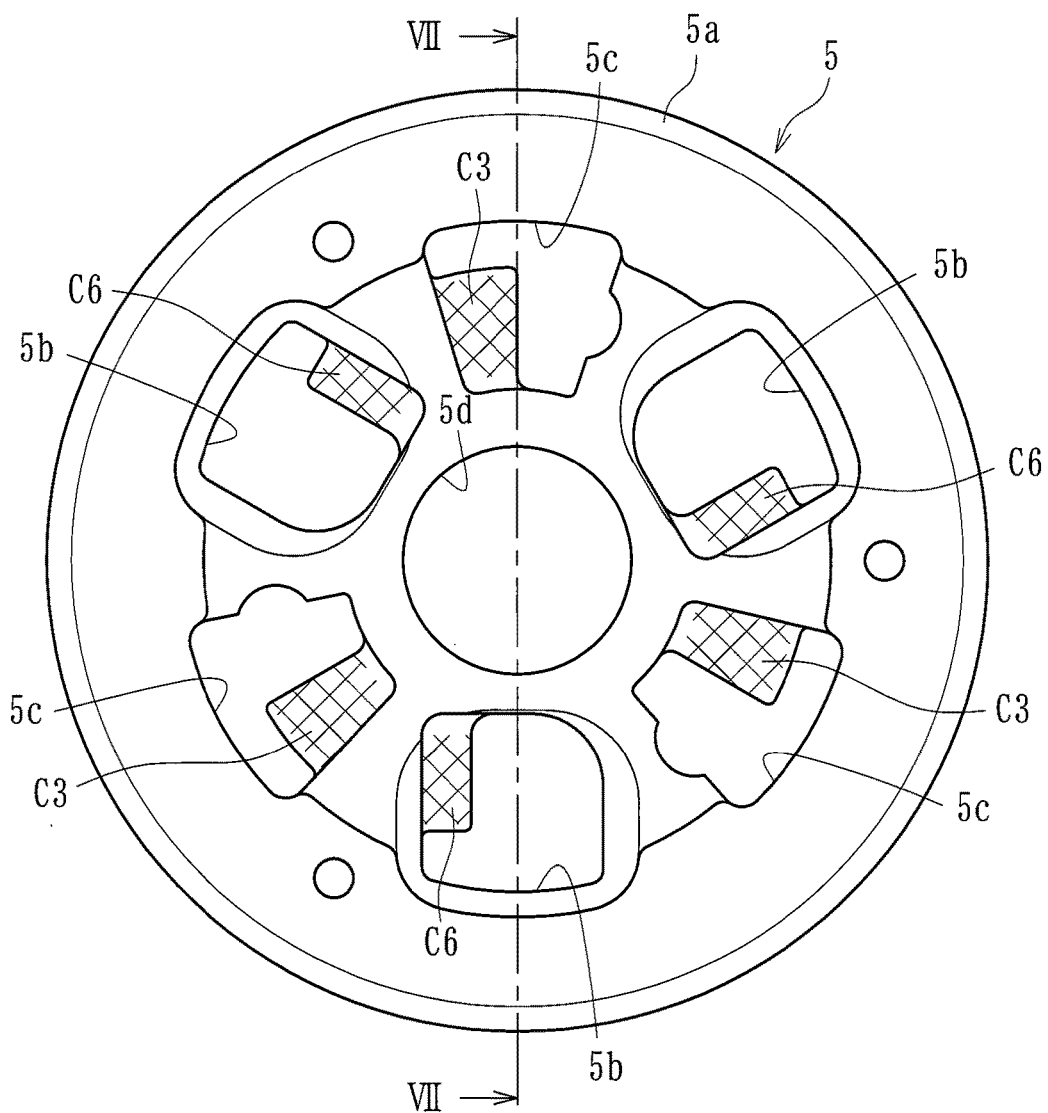
FIG. 5 is a plan view of a pressure member in the power transmitting apparatus.
Figure 6:
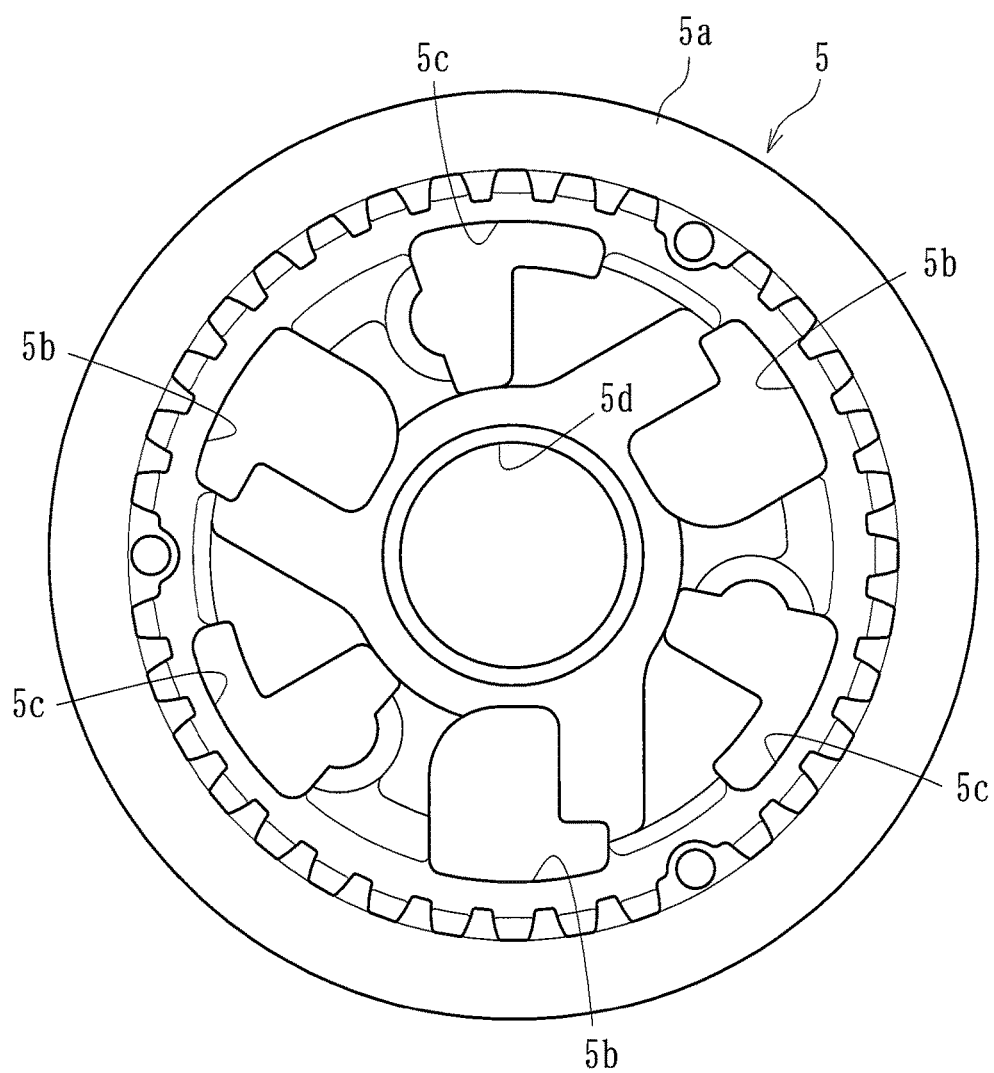
FIG. 6 is a rear plan view of the pressure member in the power transmitting apparatus.
Figure 7:
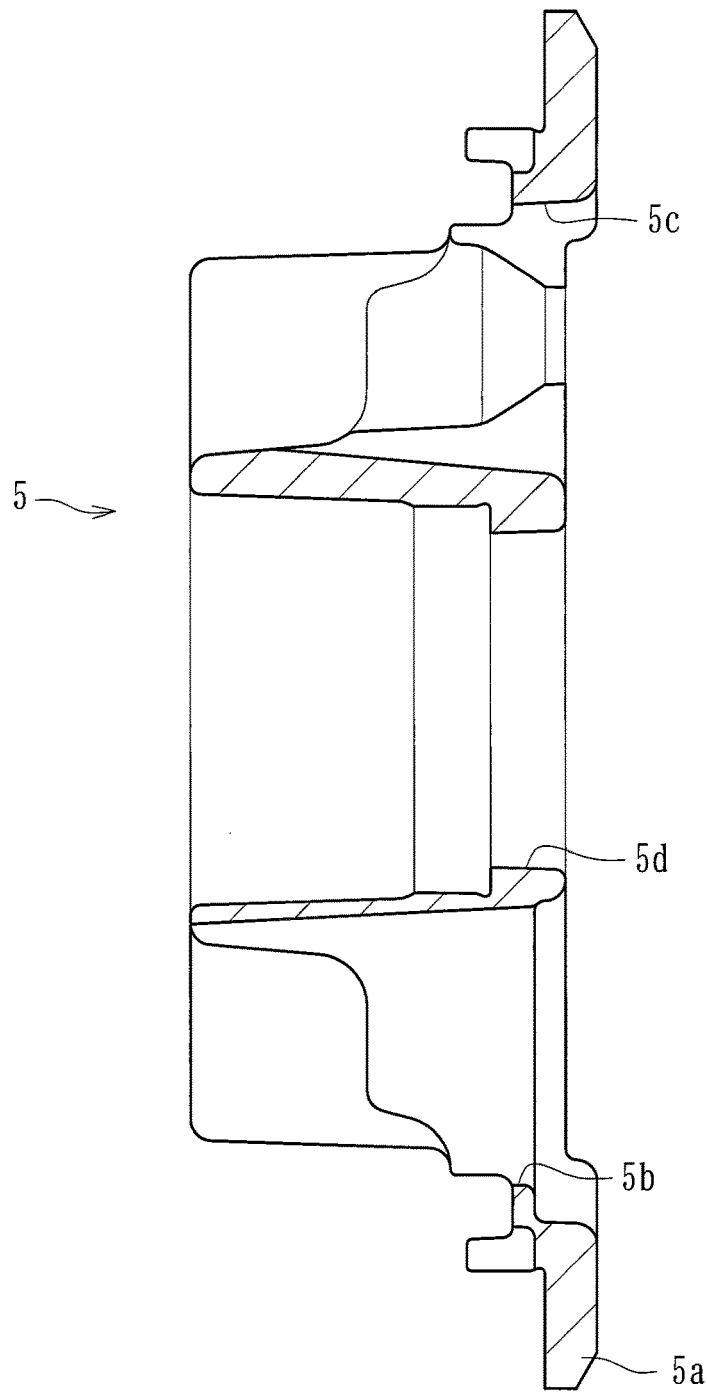
FIG. 7 is a sectional view taken along line VII-VII of FIG. 5.

The pressure member 5 is attached to the right end, in FIG. 1, of the clutch member 4. The pressure member 5 is movable in the axial direction of the clutch member 4 (the horizontal direction in FIG. 1). This brings the driving clutch plates 6 and the driven clutch plates 7 into pressure contact or into the release pressure-contact force position, with its axial movement relative to the clutch member 4. More specifically, the pressure member 5 has, as shown in FIGS. 5 to 7, a flange portion 5a that brings the driving clutch plates 6 and the driven clutch plates 7 into pressure contact. The pressure member 5 has at least one fitting hole 5b, for fitting the at least one receiving members 11, through holes 5c, and a central hole 5d.

As shown in FIG. 1, a pressed member E is fit into the central hole 5d of the pressure member 5. The ball bearing D is interposed between the two. The pressed member E is attached to the protruding end of the shaft 3. It is capable of following the movement of the pushrod 9. When a driver operates an operating means, such as a clutch lever (not shown), it causes the pushrod 9 to protrude to the right in the figure. The pressed member E moves in the same direction. Thus, the pressure member 5 can be moved, to the right (away from the clutch member 4), against the biasing force of the clutch springs 10.

When the pressure member 5 moves to the right, the pressure-contact force between the driving clutch plates 6 and the driven clutch plates 7 is released. The rotational force input to the gear 1 and the clutch housing 2 is not transmitted to the clutch member 4 and the shaft 3 and is cut off. The pressure member 5, with its axial movement relative to the clutch member 4, is configured to bring the driving clutch plates 6 and the driven clutch plates 7 into pressure contact or to release the pressure-contact force.

A plurality of (three) fitting holes 5b are formed concyclically in the pressure member 5 at regular intervals. The receiving members 11 are fit into the fitting holes 5b. The receiving members 11, fit into the fitting holes 5b of the pressure member 5 are in contact with one end of the clutch springs 10. Thus, the receiving members 11 receive the springs 10 biasing force. The receiving members 11 are separate from the pressure member 5. Specifically, the receiving members 11, according to this embodiment, include cup-like members, as shown in FIGS. 8 and 9. A recessed portion 11a houses the clutch spring 10. A receiving portion 11b is formed in the recessed portion 11a. The receiving portion 11b is in contact with one end of the clutch spring 10 and receives its biasing force. A transmitting portion 11c is in contact with the pressure member 5. The transmitting portion 11c transmits the biasing force of the clutch spring 10 to the pressure member 5.

The transmitting portion 11c includes a flange portion formed on the open side of the receiving member 11. When the receiving member 11 is fit into the fitting hole 5b, the transmitting portion 11c is in contact with the opening edge of the fitting hole 5b. After the receiving members 11 are fit into the fitting holes 5b, the clutch springs 10 are positioned in the recessed portions 11a with one end in contact with the receiving portion 11b. The biasing force of the clutch springs 10 is transmitted through the transmitting portions 11c of the receiving members 11 to the pressure member 5. The transmitted biasing force brings the driving clutch plates 6 and the driven clutch plates 7 into pressure contact.

The power transmitting apparatus according to this embodiment has a pressure-contact assist cam. The rotational force input into the gear 1, as an input member, is transmitted to the shaft 3, as an output member. The pressure member 5 and the clutch member 4 rotate relative to each other. The assist cam increases pressure-contact force between the driving clutch plates 6 and the driven clutch plates 7. When the rotation of the shaft 3, as an output member, exceeds the rotational speed of the gear 1, as an input member, and the pressure member 5 and the clutch member 4 rotate relative to each other, a back torque limiter cam releases the pressure-contact force between the driving clutch plates 6 and the driven clutch plates 7. Cam surfaces (first cam surface C1 to sixth cam surface C6) that constitute the pressure-contact assist cam and the back torque limiter cam are shown shaded (cross-hatched).

The pressure-contact assist cam, according to this embodiment, is formed by opposing a third cam surface C3 and a fourth cam surface C4, respectively, formed on the pressure member 5 and the clutch member 4. That is, when assembling the clutch member 4 and the pressure member 5, as shown in FIG. 10, a third cam surface C3, formed on the pressure member 5 (see FIG. 5) and a fourth cam surface C4, formed on the clutch member 4 (see FIG. 3) oppose one another. The rotational force input to the gear 1 is transmitted to the shaft 3. The pressure member 5 and the clutch member 4 rotate relative to each other. The pressure member 5 is moved in the α direction in the figure and closer to the clutch member 4 by the cam action of the third cam surface C3 and the fourth cam surface C4. The pressure-contact force between the driving clutch plates 6 and the driven clutch plates 7 is increased.

The back torque limiter cam, according to this embodiment, is formed by opposing a first cam surface C1 and a second cam surface C2, respectively, formed on the receiving member 11 and the clutch member 4. When assembling the clutch member 4, the pressure member 5, and the receiving member 11, as shown in FIG. 10, a first cam surface C1, formed on a side surface of the bottom portion of the receiving member 11 (see FIGS. 8 and 9), and a second cam surface C2, formed on the clutch member 4 (see FIG. 2), opposed one another. When the rotation of the shaft 3 exceeds the rotational speed of the gear 1 and the pressure member 5 and the clutch member 4 rotates relative to each other, the receiving member 11 is moved in the β direction in FIG. 10 by the cam action of the first cam surface C1 and the second cam surface C2. The biasing force of the clutch spring 10 transmitted to the pressure member 5 is reduced. The pressure-contact force between the driving clutch plates 6 and the driven clutch plates 7 is released.

The receiving member 11, according to this embodiment further has a fifth cam surface C5. The fifth cam surface C5 is formed on the side opposite to the first cam surface C1, as shown in FIGS. 8 and 9. A sixth cam surface C6 (see FIG. 5), facing the fifth cam surface C5, is formed on the pressure member 5. A first cam surface C1 and a fifth cam surface C5 is formed on both side surfaces of the bottom portion of the receiving member 11. The back torque limiter cam is formed by the first cam surface C1 and the second cam surface C2, and the fifth cam surface C5 and the sixth cam surface C6.

When assembling the clutch member 4, the pressure member 5 and the receiving member 11, as shown in FIG. 10, the first cam surface C1, formed on the receiving member 11, and the second cam surface C2, formed on the clutch member 4, opposed one another. The fifth cam surface C5, formed on the receiving member 11, and the sixth cam surface C6, formed on the pressure member 5, oppose one another. When the rotation of the shaft 3 exceeds the rotational speed of the gear 1 and the pressure member 5 and the clutch member 4 rotate relative to each other. The receiving member 11 is moved in the β direction in FIG. 10 by the cam action of the first cam surface C1 and the second cam surface C2 and the cam action of the fifth cam surface C5 and the sixth cam surface C6. Thus, the pressure-contact force between the driving clutch plates 6 and the driven clutch plates 7 is released.

When the back torque limiter cam functions, the receiving member 11 is subjected to both the cam action of the first cam surface C1 and the second cam surface C2 and the cam action of the fifth cam surface C5 and the sixth cam surface C6. In this embodiment, the slope angle (slope angle to the axis) of the first cam surface C1 and the second cam surface C2, constituting the back torque limiter cam, is substantially the same as that of the third cam surface C3 and the fourth cam surface C4 that constitute the pressure-contact assisting cam. The slope angle of the first cam surface C1 and the second cam surface C2 is substantially the same as that of the fifth cam surface C5 and the sixth cam surface C6.

In this embodiment, at least the cam surfaces formed on the receiving member 11 and the cam surfaces facing those cam surfaces (the first cam surface C1 and the second cam surface C2, and the fifth cam surface C5 and the sixth cam surface C6 in this embodiment) are flat surfaces.

Cam surfaces can be formed in a helical shape according to the size of the power transmitting apparatus. In that case, the receiving member 11 depends on the size of the power transmitting apparatus (diameters of the clutch member 4 and the pressure member 5). The receiving member 11 is a part dedicated to the power transmitting apparatus having that size. According to this embodiment, the receiving member 11 can be attached to power transmitting apparatuses of various sizes. Other cam surfaces may be helical surfaces or flat surfaces.

To assemble the clutch member 4 and the pressure member 5 according to this embodiment, as shown in FIG. 11, first, the clutch member 4 and the pressure member 5 oppose one another (see FIG. 11 (*a*)). The clutch member 4 and pressure member 5 are moved closer to each other so that the third cam surface C3 and the fourth cam surface C4 face each other. The pressure-contact assist cam is formed (see FIG. 11 (*b*)). Then, the receiving member 11 is fit into the fitting hole 5*b* of the pressure member 5. Thus, the first cam surface C1 and the second cam surface C2 face each other. Also, the fifth cam surface C5 and the sixth cam surface C6 face each other. Accordingly, the back torque limiter cam is formed (see FIG. 11 (*c*)). Thus, when assembling the clutch member 4 and the pressure member 5, clearance is reduced between a pair of cam surfaces that constitute the back torque limiter cam (the first cam surface C1 and the second cam surface C2, the fifth cam surface C5 and the sixth cam surface C6). Also, clearance can be reduced between a pair of cam surfaces that constitute the pressure-contact assist cam (the third cam surface C3 and the fourth cam surface C4). This reduces rattling According to the above embodiment, the receiving portion for the clutch spring 10 (biasing means) on the pressure member 5 side includes at least one receiving member 11 separate from the pressure member 5. The first cam surface C1 and the second cam surface C2, constituting the back torque limiter cam, are, respectively, formed on the at least one receiving member 11 and the clutch member 4. The third cam surface C3 and the fourth cam surface C4, constituting the pressure-contact assist cam, are, respectively, formed on the pressure member 5 and the clutch member 4. Therefore, the torque, when the back torque limiter cam operates, and the torque, when the pressure-contact assist cam operates, can be different from each other according to the power transmitting needs. The clutch member 4 and the pressure member 5 can be satisfactorily assembled with the cam surfaces of the pressure-contact assist cam (the third cam surface C3 and the fourth cam surface C4) facing each other with a small clearance between the two. Also, the cam surfaces of the back torque limiter cam (the first cam surface C1 and the second cam surface C2) face each other with a small clearance. Thus, this reduces rattling.

In this embodiment, the at least one receiving member 11, first cam surface C1 is formed separate from the pressure member 5. Thus, when the driver operates the clutch lever, the vibration caused by the clearance between the first cam surface C1 and the second cam surface C2 can be prevented from being transmitted from the pressure member 5 through the ball bearing D, and so forth, to the clutch lever. Thus, operability can be improved.

The first cam surface C1 and the second cam surface C2, according to this embodiment, constitute the back torque limiter cam. The third cam surface C3 and the fourth cam surface C4 constitute the pressure-contact assist cam. The torque, when the back torque limiter cam operates, can be arbitrarily set by determining the slope angle of the first cam surface C1 formed on the at least one receiving member 11. Further, the at least one receiving member 11, according to this embodiment, has the fifth cam surface C5 formed on the side opposite to the first cam surface C1. The sixth cam surface C6 faces the fifth cam surface C5. The sixth cam surface C6 is formed on the pressure member 5. The back torque limiter cam is formed by the first cam surface C1 and the second cam surface C2, and the fifth cam surface C5 and the sixth cam surface C6. Therefore, the torque, when back torque limiter cam operates, can be easily changed.

Further, in this embodiment, the slope angle (slope angle to the axial direction (horizontal direction in FIG. 1)) of the first cam surface C1 and the second cam surface C2, constituting the back torque limiter cam is substantially the same. Likewise, the slope angle of the third cam surface C3 and the fourth cam surface C4, constituting the pressure-contact assist cam, is substantially the same. Therefore, the torque, when the back torque limiter cam operates, can be modified by the cam action of the fifth cam surface C5 and the sixth cam surface C6. This is compared to the torque, when pressure-contact assisting cam operates. The slope angle of the first cam surface C1 and the second cam surface C2 is substantially the same as that of the fifth cam surface C5 and the sixth cam surface C6. Thus, the at least one receiving member 11 can smoothly operate when the back torque limiter cam operates.

The at least one receiving member 11, according to this embodiment, has the first cam surface C1 and the fifth cam surface C5, for example as shown in FIG. 12 (*c*). The at least one receiving member 11 may have the first cam surface C1 formed on only one side surface of the bottom portion. Thus it may not have the fifth cam surface C5 on the opposite side. Also in this case, the torque, when the back torque limiter cam operates, can be arbitrarily set by determining the slope angle of the first cam surface C1 formed on the at least one receiving member 11.

To assemble the clutch member 4 and the pressure member 5, according to another embodiment as shown in FIG. 12, first, the clutch member 4 and the pressure member 5 oppose one another (see FIG. 12 (*a*)). The clutch member 4 and pressure member 5 are moved closer to each other. The third cam surface C3 and the fourth cam surface C4 face each other and form the pressure-contact assist cam (see FIG. 12 (*b*)). Then, the receiving members 11 are fit into the fitting holes 5*b* of the pressure member 5. The first cam surface C1 and the second cam surface C2 face each other. Thus, the back torque limiter cam is formed (see FIG. 12 (*c*)). When assembling the clutch member 4 and the pressure member 5, the clearance can be reduced between cam surfaces constituting the back torque limiter cam (the first cam surface C1 and the second cam surface C2). Also, the clearance can be reduced between a pair of cam surfaces constituting the pressure-contact assisting cam (the third cam surface C3 and the fourth cam surface C4). Thus, rattling can be reduced.

The receiving members 11, according to this embodiment, have a recessed portion 11*a* that houses the clutch spring 10 (biasing means). A receiving portion 11*b* is formed in the recessed portion 11*a*. The receiving portion 11*b* is in contact with one end of the clutch spring 10 and receives its biasing force. A transmitting portion 11*c* is in contact with the pressure member 5. The transmitting portion 11*c* is engaged only in a direction in which the pressure member 5 is moved. This transmits the biasing force of the clutch spring 10 to the pressure member 5. Thus, the driving clutch plates 6 and the driven clutch plates 7 come into pressure contact. Therefore, when the back torque limiter cam operates, the pressure-contact force between the driving clutch plates 6 and the driven clutch plates 7 can be released more reliably and smoothly.

Further, according to this embodiment, at least the cam surfaces formed on the receiving members 11 (the first cam surface C1 and the fifth cam surface C5 in this embodiment) and cam surfaces facing those cam surfaces (the second cam surface C2 and the sixth cam surface C6 in this embodiment) include flat surfaces. Therefore, the receiving members 11 are independent of the size of the power transmitting apparatus (diameters of the clutch member 4 and the pressure member 5). The versatility of the receiving members 11 can be improved, and the production cost can be reduced. The receiving members 11 are concyclically attached to the pressure member 5. Thus, the function as a back torque limiter cam, when the receiving members 11 operate, can be performed smoothly and reliably.

Although embodiments have been described, the present disclosure is not limited to these embodiments. For example, the first cam surface C1 and the second cam surface C2, constituting the pressure-contact assist cam, may be respectively formed on the receiving members 11 and the clutch member 4. The third cam surface C3 and the fourth cam surface C4, constituting the back torque limiter cam, may be, respectively, formed on the pressure member 5 and the clutch member 4. Thus, the operations of the pressure-contact assist cam and the back torque limiter cam may be reversed compared with the above embodiment. The first cam surface C1 and the second cam surface C2, constituting one of the pressure-contact assist cam, and the back torque limiter cam may be, respectively, formed on the receiving members 11 and the clutch member 4. The third cam surface C3 and the fourth cam surface C4, constituting the other of the pressure-contact assist cam and the back torque limiter cam, may be, respectively, formed on the pressure member 5 and the clutch member 4.

Further, although in this embodiment, a plurality of receiving members are formed independently from each other, a plurality of (three in this embodiment) receiving members 11' may be integrated as shown in FIG. 13. Here, two concentric annular portions M1, M2 are provided. One end of each of the receiving members 11' is integrated with the annular portion M1. The other end is integrated with the annular portion M2. A single integrated part, as a whole, is formed. Since a plurality of receiving members 11' are integrated, the plurality of receiving members 11' can be fit into the pressure member 5 all at once. Assembling of the receiving members 11' can be improved. The power transmitting apparatus of the present disclosure can be applied to a multiplate clutch type power transmitting apparatus for motorcycles, automobiles, three or four-wheeled buggies, or general-purpose machines.

The present disclosure can also be applied to a power transmitting apparatus with a different external shape or another additional function as long as it is a power transmitting apparatus where a receiving portion for a biasing means on the pressure member side includes a receiving member separate from the pressure member. A first cam surface and a second cam surface constitute one of the pressure-contact assist cam and a back torque limiter cam. The cams are, respectively, formed on the receiving member and a clutch member. A third cam surface and a fourth cam surface, constituting the other of the pressure-contact assist cam and the back torque limiter cam, are, respectively, formed on the pressure member and the clutch member.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmitting apparatus comprising: a clutch housing that rotates with the rotation of an input member, a plurality of driving clutch plates are attached to the clutch housing; a clutch member includes a plurality of driven clutch plates formed alternately between the driving clutch plates of the clutch housing, the clutch member is connected to an output member;
   a pressure member is attached to the clutch member, the pressure member brings the driving clutch plates and the driven clutch plates into a pressure contact or to a release pressure-contact force, axial movement occurs relative to the clutch member;
   a biasing mechanism biases the pressure member in a direction so that the driving clutch plates and the driven clutch plates come into pressure contact;
   a pressure-contact assist cam increases the pressure-contact force between the driving clutch plates and the driven clutch plates when rotational force input into the input member is transmitted to the output member and the pressure member and the clutch member rotate relative to each other; and
   a back torque limiter cam releases the pressure-contact force between the driving clutch plates and the driven clutch plates when rotation of the output member exceeds the rotational speed of the input member and the pressure member and the clutch member rotate relative to each other;
   the power transmitting apparatus transmitting or cutting off rotational force input into the input member to the output member by bringing the driving clutch plates and the driven clutch plates into pressure contact or releasing the pressure-contact force;
   a receiving portion for the biasing mechanism on a side of the pressure member includes at least one receiving member separate from the pressure member;
   a first cam surface and a second cam surface, for direct contact with or release from one another, constituting one of the pressure-contact assist cam and the back torque limiter cam, are, respectively, formed on the at least one receiving member and the clutch member; and
   a third cam surface and a fourth cam surface, for direct contact with or release from one another, constituting the other of the pressure-contact assist cam and the back torque limiter cam, are, respectively, formed on the pressure member and the clutch member.

2. The power transmitting apparatus according to claim 1, wherein the first cam surface and the second cam surface constitute the back torque limiter cam, and the third cam surface and the fourth cam surface constitute the pressure-contact assist cam.

3. The power transmitting apparatus according to claim 2, wherein the at least one receiving member has a fifth cam surface formed on a side opposite to the first cam surface, a sixth cam surface, facing the fifth cam surface, is formed on the pressure member, and the back torque limiter cam is formed by the first cam surface and the second cam surface, and the fifth cam surface and the sixth cam surface.

4. The power transmitting apparatus according to claim 3, wherein the slope angle of the first cam surface and the second cam surface, constituting the back torque limiter cam, is substantially the same as that of the third cam surface and the fourth cam surface, constituting the pressure-contact assisting cam.

5. The power transmitting apparatus according to claim 4, wherein the slope angle of the first cam surface and the second cam surface is substantially the same as that of the fifth cam surface and the sixth cam surface.

6. The power transmitting apparatus according to claim 1, wherein the at least one receiving member has a recessed portion that receives the biasing mechanism, a receiving portion is formed in the recessed portion, the receiving portion is in contact with one end of the biasing mechanism and receives its biasing force, and a transmitting portion is in contact with the pressure member to transmit the biasing force of the biasing mechanism to the pressure member.

7. The power transmitting apparatus according to claim 1, wherein at least cam surfaces formed on the at least one receiving member and cam surfaces facing the receiving member cam surfaces comprise flat surfaces.

8. The power transmitting apparatus according to claim 1, wherein a plurality of the receiving members are concyclically attached to the pressure member.

9. The power transmitting apparatus according claim 1, wherein the plurality of receiving members are integrated.

* * * * *